US010929402B1

(12) United States Patent
Meng

(10) Patent No.: US 10,929,402 B1
(45) Date of Patent: Feb. 23, 2021

(54) SECURE JOIN PROTOCOL IN ENCRYPTED DATABASES

(71) Applicant: Amazon Technologies, Inc., Seattle, WA (US)

(72) Inventor: Xianrui Jeri Meng, Newcastle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 376 days.

(21) Appl. No.: 16/101,191

(22) Filed: Aug. 10, 2018

(51) Int. Cl.
*G06F 16/00* (2019.01)
*G06F 16/2455* (2019.01)
*H04L 9/08* (2006.01)
*H04L 9/00* (2006.01)
*G06F 16/2453* (2019.01)

(52) U.S. Cl.
CPC .... *G06F 16/2456* (2019.01); *G06F 16/24544* (2019.01); *H04L 9/008* (2013.01); *H04L 9/0816* (2013.01)

(58) Field of Classification Search
CPC ........... G06F 16/2456; G06F 16/24544; H04L 9/008; H04L 9/0816
USPC ........................................................ 707/714
See application file for complete search history.

(56) References Cited

U.S. PATENT DOCUMENTS

| | | | | |
|---|---|---|---|---|
| 5,930,785 A * | 7/1999 | Lohman | ............ | G06F 16/24544 |
| 7,845,011 B2 * | 11/2010 | Hirai | ........................ | G06F 21/10 |
| | | | | 726/26 |
| 9,087,212 B2 * | 7/2015 | Balakrishnan | ...... | G06F 21/6227 |
| 10,496,638 B2 * | 12/2019 | Wang | ..................... | G06F 16/215 |
| 2010/0008509 A1 * | 1/2010 | Matsushita | ........... | H04L 63/061 |
| | | | | 380/279 |
| 2011/0093883 A1 * | 4/2011 | Sun | ..................... | H04N 21/2668 |
| | | | | 725/31 |
| 2011/0280068 A1 * | 11/2011 | Patapoutian | ........ | G11C 11/5628 |
| | | | | 365/185.03 |
| 2013/0191650 A1 | 7/2013 | Balakrishnan et al. | | |

(Continued)

OTHER PUBLICATIONS

Xianrui Meng et al "Top-K Processing on Encrypted Databases with Strong Security Guarantees" dated Jan. 18, 2018, pp. 1-35.

(Continued)

*Primary Examiner* — Hanh B Thai
(74) *Attorney, Agent, or Firm* — Robert C. Kowert; Kowert, Hood, Munyon, Rankin & Goetzel, P.C.

(57) ABSTRACT

Computer systems and associated methods are disclosed to implement a table join protocol for two encrypted database tables using two different servers. In embodiments, responsive to a query that specifies a join of two tables, a first server performs a join operation on encrypted representations of the join attributes of two rows from the two tables to determine an encrypted join indicator. The join attributes are encrypted in a scheme that is homomorphic with respect to the join operation. The first server sends the join indicator to a second server to be decrypted, and then uses the decrypted join indicator to determine whether the two rows satisfies the join. In embodiments, the first server does not possess the decryption key for the encrypted representations, and the second server does not have access to the encrypted representations. The division of labor thus reduces the vulnerability of both individual servers.

20 Claims, 10 Drawing Sheets

(56) References Cited

U.S. PATENT DOCUMENTS

2015/0039912 A1* 2/2015 Payton ............... H04L 9/008
 713/193
2017/0310479 A1* 10/2017 Sato ................ H04L 9/0822
2018/0317089 A1* 11/2018 Levesque .......... H04W 12/0401
2019/0220619 A1* 7/2019 Loza ................ G06F 21/602

OTHER PUBLICATIONS

Andrew Chi-Chih "Some Complexity Questions Related to Distributive Computing" (Stanford University and Xerox Parc) dated 1979, pp. 1-5.

* cited by examiner

SECURE JOIN PROTOCOL IN ENCRYPTED DATABASES

BACKGROUND

As remote storage and cloud computing services continue to mature, many enterprises, organizations, and end users are beginning to outsource their data to cloud-based database service providers for reliable maintenance, lower cost, and better performance. In recent years, a number of database systems in the cloud have been developed that offer high availability and flexibility at relatively low costs. However, despite their benefits, there are still a number of reasons that make many users to refrain from using these services. In particular, privacy concerns in cloud-based databases have become more and more important, especially for users with sensitive and valuable data. Many data owners and clients still do not fully trust cloud-based databases due to the fear that hackers or rogue administrators may compromise their data. One approach to address these concerns is to encrypt the data before outsourcing the data to the cloud. However, encryption also creates significant difficulties in querying and computing over these data. In one regard, it is generally difficult to perform a table join on two encrypted tables without leaking some information about the protected data to processes in the cloud-based database. Such problems make servers in such databases vulnerable to different types of attacks.

Figure 1:
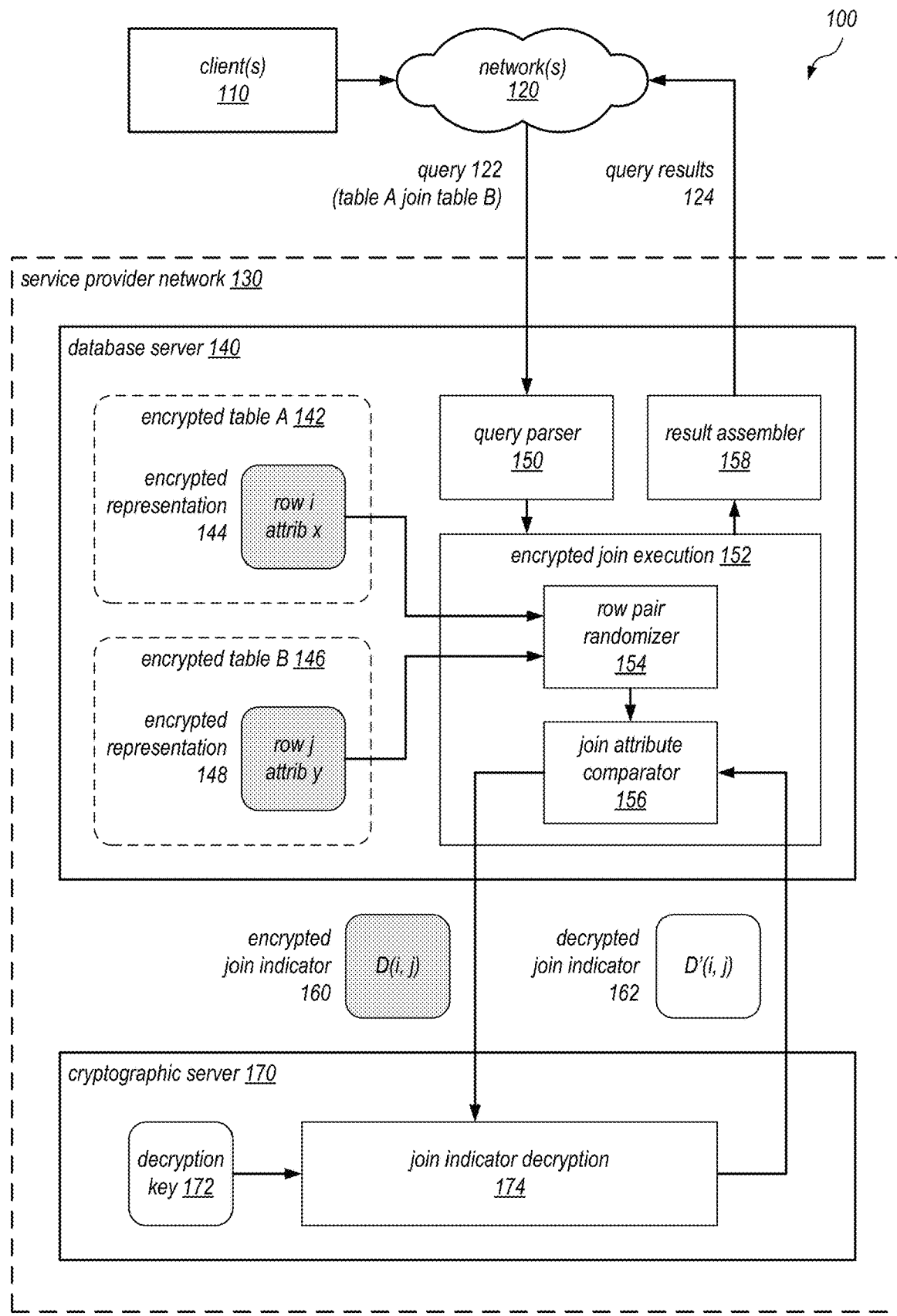
FIG. 1 is a block diagram illustrating an example database system that uses a two-server protocol to perform joins on encrypted tables, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

DETAILED DESCRIPTION OF EMBODIMENTS

The systems and methods described herein may be used to implement a database system to perform table joins on encrypted tables using a two-server table join protocol. In embodiments, the two-server protocol divides the work of a table join between the two servers so that each server leaks less information about the protected data, making each server less vulnerable to data attacks.

Table join operation combines columns from multiple tables and are commonly used in table queries. For example, in a relational database, a query or view that joins two tables may return a set of records that combines the columns by using a set a common set of join columns of the two tables. In some cases, more than two tables may be joined together using multiple sets of join columns.

However, table joins of encrypted tables creates significant challenges for the database system designer. In particular, when the database server performs the join, it needs to determine on some level that two attributes in two rows of the two tables are equal. It is generally difficult to accomplish this comparison without a deciphering of these two attributes at the database server. Moreover, performing the join in a single database server causes that server to act as a single point for information leakage that may be observed to infer the contents of protect data. Accordingly, the database server becomes a highly attractive target for potential attacks. Some prior works have proposed solutions for executing joins over encrypted data. However, in these works, the server performing the join is still able to learn some equality pattern on the encrypted attributes if records are successfully joined. Some prior solutions cause extremely amounts of computational or storage overhead when querying large data sets, rendering them unpractical for real-world database systems.

Accordingly, embodiments of the database system disclosed herein implements a secure join protocol that uses two servers to divide the work of the join operation, so that neither server retains significant knowledge of the data values used to perform the joins. In embodiments, the division of labor is accomplished using a data structure that semantically encrypts a representation of the join attributes in the tables. The encryption used is homomorphic with respect to a join or compare operation that is used to produce an encrypted join indicator at the first server. The encrypted result is generated by the first server but not decrypted by the first server. Instead, the encrypted result is sent to a second server, which obliviously decrypts the result and provides it back to the first server. The first server then uses the decrypted result to perform the join.

Thus, under the protocol, the first server does not decrypt the encrypted data in the tables. It only computes an encrypted result (e.g., a join indicator) from two encrypted rows in the table. Moreover, the second server does not obtain the encrypted row data in plaintext; it only obliviously decrypts a join indicator of two unknown values. In addition, it is also noted that the first server is not required to maintain a decryption key that decrypts the data structure used to performed the join. On the other hand, the second server does not require access to any of the encrypted data structures used to perform the join. Thus, neither of the two servers statically stores all of the information needed to perform the secure join, making both less attractive targets for adversarial attacks.

In embodiments, the join protocol is made more secure by randomizing the order that join indicators are sent by the first server to the second server. As may be understood, in some circumstances, the second server may be able to infer certain information about the encrypted data in the tables by observing the pattern or ordering of the join indicators that it receives. To guard against this possibility, in some embodiments, the first server may send the join indicators to the second server in a pseudorandom order. In some embodiments, the first server may also occasionally inject fabricated join indicators to its decryption requests to prevent the second server from extracting any useful knowledge from the pattern of requests.

In some embodiments, the data structure used to encrypt the join attribute values in the tables may be a compact data structure that is stored with each join attribute. In some embodiments, the data structure may be fixed in size, so that they can be used to reduce any join attributes in the table to input parameters for the join operation. In some embodiments, the data structure may be a space-efficient probabilistic data structure, which may be selected to reduce the probability of false positives results for the join or compare operator. In some embodiments, the data structure may employ a type of encryption scheme that is homomorphic with respect to the join operation. In this way, the join operation can be performed on two encrypted data structures to obtain an encrypted result that decrypts to the result of another operation (e.g., an equality comparison) performed on unencrypted versions of the join attributes. In some embodiments, the secure join protocol may employ an encrypted hash list (EHL) structure as its encryption data structure for join values and an e operator as the join operator, as described below.

As may be understood, the secure join protocol describe herein may be used to implement a database system where table joins may be performed by two servers that do not trust each other. In some embodiments, the first server may be a database server operated by a database service provider that is hosting an encrypted database for a client. The first server may have access to the encrypted data of a client. In some embodiments, the second server may be a decryption server operated by an independent cryptographic service provider. The second server may have access to a decryption key that decrypts join indicators from the first server, but do not have access to the encrypted data of the client. Depending on the embodiment and the security safeguards or assumptions that exist in a system, the two servers may be situated differently. For example, in some embodiments, the two servers may be hosted within a single service provider's environment, but the two servers are guaranteed to be independent (e.g., exists on two separately protected networks). In some embodiments, the second server may be controlled by the database client. As long as the two servers are not likely to be jointly compromised, some security benefits of the two-server protocol are maintained. These and other features and benefits of the inventive system and method are described in more detail below, in connections with the figures.

FIG. 1 is a block diagram illustrating an example database system that uses a two-server protocol to perform joins on encrypted tables, according to some embodiments. As shown, the system 100 may include one or more clients 110, which communicates with a service provider network 130 over a network 120.

The service provider network 130 may provide computing resources via one or more computing services to the client(s) 110. The service provider network 130 may be operated by an entity to provide one or more services, such as various types of cloud-based computing or storage services, accessible via the Internet and/or other networks to client(s) 110. In some embodiments, the service provider network 130 may implement a web server, for example hosting an e-commerce website. Service provider network 130 may include numerous data centers hosting various resource pools, such as collections of physical and/or virtualized computer servers, storage devices, networking equipment and the like, needed to implement and distribute the infrastructure and services offered by the service provider network 130. In some embodiments, service provider network 130 may employ computing resources for its provided services. These computing resources may in some embodiments be offered to client(s) 110 in units called "instances," such as virtual compute instances.

The client(s) 110 may encompass any type of client configurable to submit requests to the service provider network 130. For example, a given client 110 may include a suitable version of a web browser or may include a plug-in module or other type of code module configured to execute as an extension to or within an execution environment provided by a web browser. Alternatively, a client 110 may encompass a client application such as a dashboard application (or user interface thereof), a media application, an office application or any other application that may make use of the computing resources to perform various operations. In some embodiments, such an application may include sufficient protocol support (e.g., for a suitable version of Hypertext Transfer Protocol (HTTP)) for generating and processing network-based services requests without necessarily implementing full browser support for all types of network-based data. In some embodiments, client(s) 110 may be configured to generate network-based services requests according to a Representational State Transfer (REST)-style network-based services architecture, a document- or message-based network-based services architecture, or another suitable network-based services architecture. In some embodiments, the service provider network 130 may offer its services as web services, and the client(s) 110 may invoke the web services via published interfaces for the web services. In some embodiments, a client 110 (e.g., a computational client) may be configured to provide access to a computing service 130 in a manner that is transparent to applications implemented on the client(s) 110 utilizing computational resources provided by the service provider network 130.

The client(s) 110 may convey network-based services requests to the service provider network 130 via network 120. In various embodiments, network 120 may encompass any suitable combination of networking hardware and protocols necessary to establish network-based communications between clients 110 and service provider network 130. For example, a network 120 may generally encompass the various telecommunications networks and service providers that collectively implement the Internet. A network 120 may also include private networks such as local area networks (LANs) or wide area networks (WANs) as well as public or private wireless networks. For example, both a client 110 and the service provider network 130 may be respectively provisioned within enterprises having their own internal networks. In such embodiments, the network 120 may include the hardware (e.g., modems, routers, switches, load balancers, proxy servers, etc.) and software (e.g., protocol stacks, accounting software, firewall/security software, etc.) necessary to establish a networking link between the client 110 and the Internet as well as between the Internet and service provider network 130. In some embodiments, client(s) 110 may communicate with service provider network 130 using a private network rather than the public Internet.

In some embodiments, the service provider network 130 may provide a database service or a data warehouse service. These services may employ one or more database servers 140, as shown. As discussed in some embodiments, the database servers 140 may be instances of virtual machines, which are hosted on physical hosts in the service provider network 130. In some embodiments, many servers 140 many be combined into a cluster, which may be used to support a distributed database system. In some embodiments, individual servers 140 may be added or removed to the database service on-demand, or automatically depending on a scaling policy. In this manner, the database service may be automatically scaled.

In some embodiments, the database service or server 140 may receive query requests 122, and responsively return query results 124. In some embodiments, the database server 140 may implement a relational database. In some embodiments, the query 122 may be specified in a Structured Query Language (SQL) request. In some embodiments, the query may specify the joining of two or more tables, such as for examples table A and table B, as shown. In some embodiments, the database service or server 140 may provide a variety of database management functions, such as the insertion, updating, and deletion of data in the database; the creation, deletion, and modification of database objects such as tables or indexes; and the loading of data via various data loading tools such as extract, transform, and load (ETL) tools.

In some embodiments, the database service or server 140 may be configured to maintain an encrypted database. For example, in some embodiments, the tables in the database, such as table A 142 and table B 146 may be encrypted tables. Depending on the embodiment, the tables or other database objects may be encrypted using different techniques. In some embodiments, the individual data items or attributes in the tables may be encrypted via an encryption scheme. In some embodiments, the database system or service may not decrypt the encrypted data in the encrypted tables, and the query results 124 may be returned in encrypted form. In some embodiments, the data in the encrypted tables may be permutated, for example, via a pseudorandom column or row permutation. In some embodiments, such data permutation are performed obliviously by the database server when servicing queries or updates to the tables, so that an attacker cannot easily learn or reproduce the permutation by observing the operations of the database server. Depending on the embodiment, a variety of different security techniques may be employed to hide the data in the encrypted tables from unauthorized users. Depending on the embodiment, a variety of different encryption schemes may be used.

As shown, in some embodiments, the database server 140 may implement a query parser 150, a encrypted join executor 152, and a result assembler 158. In some embodiments, some of these components may be implements as part of a larger querying handling subsystem of the database service. In some embodiments, the encrypted join executor 152 may be part of a query engine implemented by the database service. In some embodiments, the query engine may implement a variety of querying functionalities of the database service.

In some embodiments, the query 122 may be provided to the query parser 150, which may parse the query in received form into a representation that may be used for processing by the query engine. In some embodiments, the query 122 may be received as a query token. In some embodiments, the query token may be encrypted or compressed. In some embodiments, the query token may specify the select columns of the query, one or more filter conditions, and one or more join conditions, among other things. In some embodiments, the query parser 150 may extract such information from the query token and translate this information into parameters that can be used by the query engine. For example, in some embodiments, the query parser 150 may translate columns (e.g., the join columns for tables A and B) into column identifiers that can be used by the query engine to access the correct columns.

In some embodiments, the database system, as part of its encryption, may permutate the columns of the encrypted tables 142 and 146. In some embodiments, the encryption may be performed using a permutation key that causes the columns be stored in pseudorandom locations or assigned to pseudorandom column identifiers. In some embodiments, the permutation key may be provided to authorized database clients, so that they can generate the permutated column identifiers for desired columns. In some embodiments, the clients 110 may include a client module that performs this generation automatically, so that the query 122 will specify the permutated column identifiers. When the query 122 is received, the query parser 150 will obliviously determine the columns or column storage locations based on the permutated column identifiers and instruct the query engine to process the query using the specified columns.

In some embodiments, as shown, the query parser 150 may provide the column identifiers, for example, the join columns for tables A and B, to the encrypted join executor 152. In some embodiments, the encrypted join executor 152 may implement or instruct a row pair randomizer 154 to combine in memory random pairs of rows from the two tables 142 and 146 to be joined. As shown, the row pair randomizer may obtain, for each row pair, the respective encrypted representations 144 and 148 of the join attributes of the rows. For example, if tables A and B are to be joined based on a column BUYER ID in table A and a column COMPANY ID in table B, the respective encrypted representations of these two attributes are obtained for all combinations of row pairs from the two tables.

In some embodiments, as suggested by the name of the component, the row pair randomizer may randomize the row pairs in a pseudorandom order. In some embodiments, the randomization may be performed at the time of fetching. In some embodiments, the randomization may be performed when the row pairs are generated in memory, or when the row pairs are provided to downstream components, such as the join attribute comparator 156. In some embodiments, the randomizer 154 may read blocks of batches of rows into memory, and performs a randomizing operation within the block, on the individual blocks, or both. In some embodiments, the randomization may be performed as or after the row pairs are generated.

As discussed, in some embodiments, this randomization of the row pairs allows the database server 140 to send decryption requests to the cryptographic server 160 in pseudorandom order. In this way, the cryptographic server 170 is less able to infer any information about the encrypted data in the tables 142 and 146 based on the pattern of the decryption requests. In some embodiments, the row pair randomizer 154, join attribute comparator 156, or the encrypted join executor 152 may employ other techniques to obscure its access pattern to the cryptographic server 170. In some embodiments, the server 140 may generate artificial or synthetic decryption requests to the cryptographic server 170. In some embodiments, the server 140 may randomize the timing of the decryption requests. In some embodiments, the server 140 may interleave decryption requests for multiple table joins or multiple databases (e.g., belonging to different clients of the service provider network), in order to obscure its request pattern.

As shown, in some embodiments, the encrypted join executor 152 may implement a join attribute comparator 156. The join attribute comparator 156 may be tasked with evaluating the join attributes (i.e., the encrypted representations 144 and 148) of each row pair and determine whether the join attributes of the two rows are equal and should thus be added to the result set for the query (or included as intermediate results for further processing). In some embodiments, the join attribute comparator 156 does not decrypt the encrypted representations 144 and 148. In some embodiments, the database server 140 does not have access to the decryption key that decrypts these representations. Instead, in some embodiments, the join attribute comparator 156 may perform a join operation on the two encrypted representations 144 and 148, to obtain a join indicator.

In some embodiments, the join operator may be a homomorphic operation with respect to the encryption scheme that is used to encrypt the encrypted representations 144 and 148. That is, the join operations, when applied to the encrypted representations 144 and 148, produces (or probabilistically produces) the same result as a corresponding operation applied to the decrypted forms of the join attributes. As one example, the Paillier encryption scheme is homomorphic with respect to certain types of operations. For example, the produce of two ciphertexts obtained using a Paillier encryption scheme will decrypt to the sum of their corresponding plaintexts. As may be appreciated by those skilled in the art, other types of encryption schemes exist that have homomorphic properties with respect to different types of operations.

As shown, in some embodiments, the join attribute comparator 156 may generate a result or join indicator as a result of the homomorphic join operation. In some embodiments, the result may comprise an encrypted join indicator 160, as shown in the figure. This encrypted join indicator 160 may be sent to a cryptographic server 170. In some embodiments, each indicator 160 for each row pair may be send individually. In some embodiments, a batch of indicators 160 may be send as an aggregated and randomized block.

As shown, the cryptographic server 170 may be tasked with decrypting the encrypted join indicator 160. Although the server 170 is depicted in this example as belong to the same service provider network 130 as the database server 140, in some embodiments, the cryptographic server 170 may belong to a different service provider network or be operated or controlled by an entity or company other than the database server. In some embodiments, the cryptographic server may be part of a standalone cryptographic service, which may be accessed via the public cloud to perform certain cryptographic tasks. In some embodiments, the cryptographic service provider may maintain a secret key (e.g., decryption key 172) for a client, and perform various requested cryptographic operations (e.g., decryptions, signings) using the secret key.

As shown, in some embodiments, the cryptographic server 170 may implement a join indicator decryption module 174. The decryption module may be configured to obliviously decrypt incoming join indicators 160 using the decryption key 172. The cryptographic server 170 may then return the decryption form of the join indicator 162 back to the database server 140. As may be understood, the cryptographic server 170 does not require access to the encrypted data of the join attributes in the tables 142 and 146. The cryptographic server 170 simply repeatedly and obliviously decrypts incoming join indicators 160, without gaining any knowledge of the rows that generated the indicator, or even any contextual information about the indicator. Accordingly, even if the cryptographic server 170 is successfully compromised, the attacker will gain very little knowledge of the encrypted data in the database server 140.

As shown, the decrypted join indicator 162 is received by the database server 140, for example at the join attribute comparator 156. In some embodiments, the join attribute comparator 156 uses the indicator 162 to determine whether a given row pair should be joined as a result row. In some embodiments, the comparator 156 may check if the join indicator indicates that the two rows are equal (i.e., if the join indicator is 0). If so, the row pair is joined for the result set or for further query processing. Notably, in performing is part of the protocol, the database server 140 and the join attribute comparator 156 never decrypts the encrypted representations 144 and 148 of the join attributes. Thus, it only sees whether any two random encrypted rows are joined. Even if server 140 was successfully attacked, the attacker will not be able to decipher the encrypted information in the tables.

As shown, in some embodiments, the encrypted join executor 152 then returns row pairs back to a results assembler 158. In some embodiments, all row pairs that meet the join condition, for example where the pair of rows have equal values for their join attributes, are returned to the result assembler 158. In some embodiments, the result assembler may perform certain post processing tasks to prepare the result set to be returned as query results 124, or be further processes by downstream processing stages in the query engine, according to the query plan. For example, in some embodiments, the results assembler may format the select columns of the query or sort the query results according to some sort order. In some embodiments, the result assembler may prepare the resulting rows as intermediate results, so that they can be joined to the rows of another table.

Figure 2:
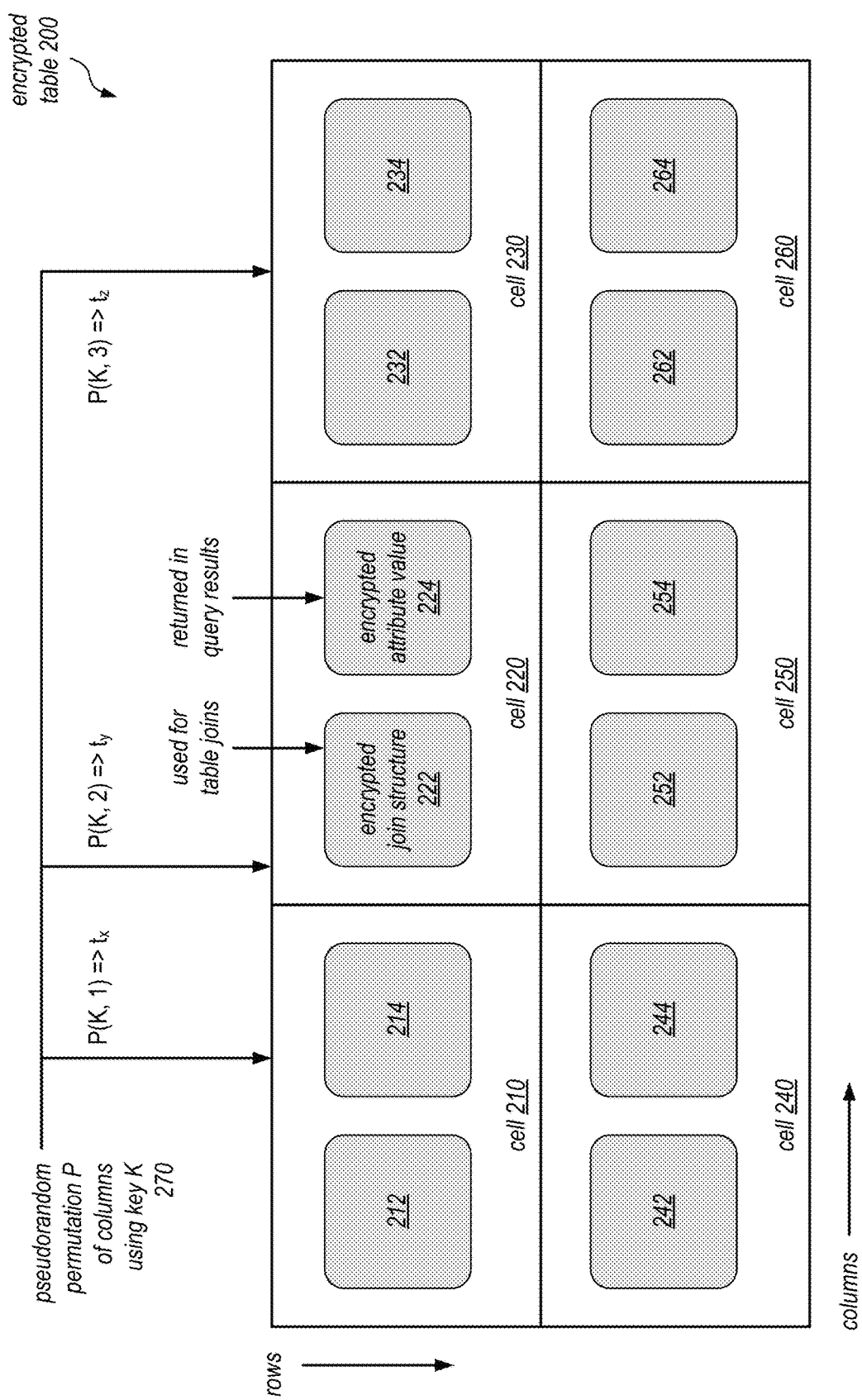
FIG. 2 illustrates an example encryption format to encrypt a table in a database system that uses a two-server table join protocol for encrypted tables, according to some embodiments.

FIG. 2 illustrates an example encryption format to encrypt a table in a database system that uses a two-server table join protocol for encrypted tables, according to some embodiments. The encrypted table 200 shown in the figure may be used as the encrypted tables A 142 and B 146 of FIG. 1. As shown, the table 200 has a number of rows and columns, resulting in a number of table cells 210, 220, 230, 240, 250, and 260. In this example, only six cells are shown. As discussed, in some embodiments, the tables may be stored as part of a relational database.

As shown, in some embodiments, each cell value or attribute in the table may be stored as a vector of two or more values. For example, as shown for cell 220, the attribute value is encrypted into two representations. Representation 222 is shown as an encrypted join structure, which may be used as the encrypted representations for table joins, as explained in connection with FIG. 1. In some embodiments, the structure 222 may be used as an identifier for the attribute that can be compared to other similar identifiers of attributes in order to perform table joins. In some embodiments, the encrypted join structure may be a probabilistic data structure. In some embodiments, the encrypted attribute value 224 may be obtained from a Paillier encryption of the attribute value. Representation 224 may be another encrypted representation of the attribute value, which may be returned in query results. In some embodiments, the representation 224 may also be a probabilistic data structure. In some embodiments, the representation of data structure 222 may be a space-efficient representation that reduces or normalizes any attribute value into a fixed size vector, so that it can be used as a parameter to the homomorphic join operations. In some embodiments, the representation 222 may be generated via one or more hash functions applied to the attribute value of the cell. Thus, in some embodiments, there is some probability that different values may map to the same representation, which may cause false positives to be occur via the join operation. In some embodiments, such probabilities of false positives may be reduced or bounded by using more hash functions or larger data structures. In some embodiments, the representations 222 may comprise encrypted hash lists (EHLs) generated from the attribute values, as described in further detail below. In some embodiments, the representation 224 may be generated via a lossless encryption. Thus, in some embodiments, a decryption of the representation 224 can completely reproduce the underlying attribute value.

As shown, the encrypted table may also employ a pseudorandom permutation 270 of the columns as part of its encryption process. In some embodiments, the pseudorandom permutation may be performed via a permutation function P, which takes as its input a premutation key K. When the function P is applied to each of the columns with the permutation key K, a permutated column identifier t is generated for each column. In some embodiments, the column identifier t may specify the actual storage location of the column data. In some embodiments, the permutation key K may be used to determine, for any column in the unencrypted table, the permutated column identifier for that column. In some embodiments, the key K may be distributed to clients of the database, so that they can use the key to determine the column identifiers of desired columns in their queries and submit the query with the determined column identifiers.

An example encryption setup process for two tables is provided below:

---

Algorithm 1: Enc($R_1$, $R_2$)

---

Generate public/secret key pk, sk for a Paillier encryption
Generate random secret keys $k_1, \ldots, k_s$ for an EHL encryption
for each $o_j^i \in R_i$ do
    for each attribute $o_j^i \cdot x_k$ do
        set $E(s_k) \leftarrow \langle EHL(o_j^i \cdot x_k), [\![o_j^i \cdot x_k]\!]\rangle$
    end
    set the encrypted object $E(o_j^i) = (E(s_1), \ldots, E(s_m))$
end
Generate a key K for pseudorandom distribution permutation P, and
    permute the encrypted columns based on P. i.e., set $E(0_j^i) =$
    $(E(s_{P(K,1)}), \ldots E(s_{P(K,m)}))$
Output the permuted encrypted database as follows:
    $E(R_1) = \{E(0_1^1), \ldots, E(0_{n_1}^1)\}$ and $E(R_2) = \{E(0_1^2), \ldots, E(0_{n_2}^2)\}$

---

In the algorithm show above, $R_1$ and $R_2$ refer to two relations or tables in the encrypted database, which may be joined in a query. Each tuple or row in $R_i$ has $m_i$ many attributes and each $R_i$ has $n_i$ many tuples for i={1, 2}. The variable $o_j^i$ denotes the jth object or row in $R_i$ and the variable $o_j^i \cdot x_k$ denote the kth attribute value in the row. Furthermore, the notation $[\![x]\!]$ denotes an encryption of x. In this example, the encryption scheme is the Paillier encryption performed using the public key pk. In some embodiments, the EHL data structure may use the same encryption scheme (e.g. Paillier encryption scheme) as the second encrypted portion of the encrypted attribute. In some embodiments, the two portions may use different encryption schemes.

Figure 3:
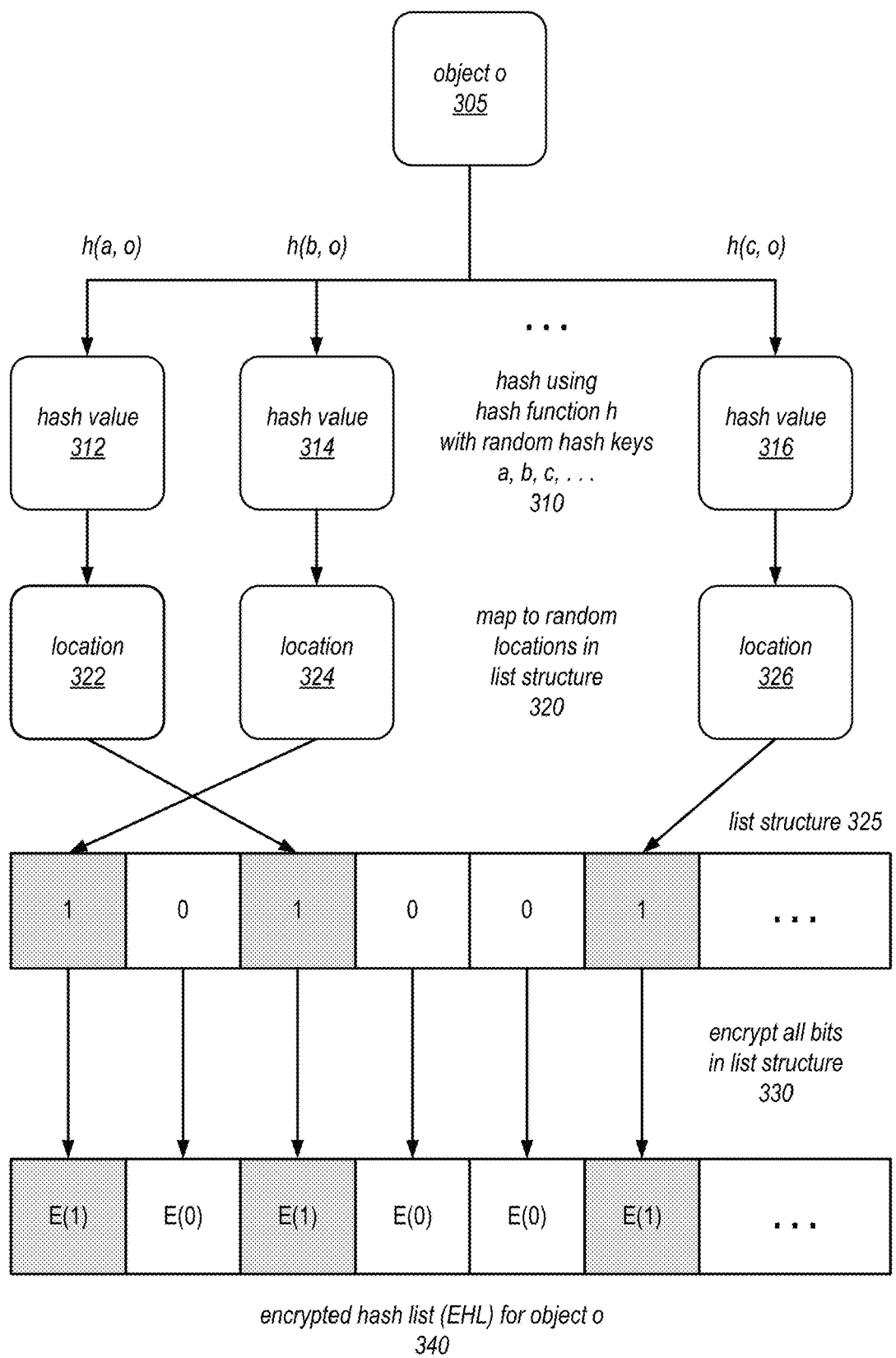
FIG. 3 illustrates an example encrypted hash list data structure that is used to encrypt table values in a database system that uses a two-server table join protocol for encrypted tables, according to some embodiments.

FIG. 3 illustrates an example encrypted hash list data structure that is used to encrypt table values in a database system that uses a two-server table join protocol for encrypted tables, according to some embodiments. In some embodiments, the encrypted hash list data structure produced by the depicted process may be used as the encrypted representation 222 of the join attribute, as discussed in connection with FIG. 2.

As shown, the building of the encrypted hash list, or EHL, begins when an object 305 to be encrypted. For example, the object may be an attribute value in a table that is to be used as a join attribute in a query.

As shown, the object 305 is first hashed using a series of hash functions, which may be obtained via a generalized hash function h and a number of random hash keys, a, b, c, etc., as shown in operation 310. As a result of this hashing, a set of hash values including hash values 312, 314, and 316 are generated. In some embodiments, the hash keys a, b, c, etc., may be generated via a pseudorandom function. Thus, in some embodiments, the set of hash functions are randomly selected for the particular table or the particular set of joinable columns. In some embodiments, the hash keys may be stored a part of the decryption key, for example, by the cryptographic server 170 of FIG. 1.

At operation 320, the hash values are mapped or converted into random location values for a list structure 325. In some embodiments, the list structure may be a fixed sized list with a number of addressable entries. In some embodiments, a modulo operation is performed on the hash values to reduce them to a location value (e.g., locations 322, 324, 326) for a location in the list structure. For example, for a list of size 16, the hash values may be reduced to values between 0 and 15. Because the hash functions are randomly selected according to the randomly generated hash keys, the list structure 325 that is generated is also randomized. In some embodiments, a decryption of the EHL values or any encrypted results of EHL values produced by homomorphic operations requires the possession of the hash keys used to generate the EHLs.

In some embodiments, the list structure 325 may be initialized with all entries having an initial value of zero. In some embodiments, the list structure 325 may be modified so that the entry at location values computed from the hash functions are set to one, as shown. In some embodiments, the list structure 325 is a bit vector that probabilistically represents the contents of the attribute value. As may be understood, in some cases, two different values may result in the same list structure. However, the chances of such collisions may be reduced by increasing the size of the list structure or increasing the number of hash functions.

At operation 330, as shown, an encryption is applied to each entry in the list structure 325. The resulting list structure is the EHL 340 of the input object o. In some embodiments, the encryption scheme used is a semantically secure scheme, which may map a value of 0 or 1 into many different values. In some embodiments, the encryption may be homomorphic with respect to certain operations. For example, in some embodiments, a Paillier encryption may be used. Under this encryption scheme, a multiplication of two encrypted values will decrypt to a sum of the two values in decrypted form. Using this homomorphic property of the encryption scheme, a homomorphic join operator may be defined. For example, in some embodiments, the homomorphic operation may be chosen to replicate a bitwise subtraction of two unencrypted list structures 325. If the bitwise subtraction results in a zero, there is high probability that two values associated with those list structures are equal. To replicate this comparison on the encrypted representations of EHL, the join operator may perform a multiplication of each bit in the two EHL structures. Accordingly, the homomorphic comparison or join operation may be performed on encrypted data structures, the same way that they can be performed on decrypted data.

In some embodiments, the EHL data structure uses the Paillier encryption to encrypt the entries in the vector. However, in other embodiments, other encryption schemes with homomorphic properties may be used.

In some embodiments, a homomorphic join operator e that may be used with the EHL encryption. The join operator may be defined as follows in some embodiments:

$$EHL(x) \ominus EHL(y) \stackrel{def}{=} \prod_{i=0}^{H-1} (EHL(x)[i] \cdot EHL(y)[i]^{-1})^{r_i} \quad (1)$$

In the above equation, x and y are inputs to EHL data structures, and $r^i$ is a random parameter that is used to perform the Paillier encryption at each entry of the list structure. Thus, each entry of the list structure is encrypted differently, based on the parameter $r^r$. In some embodiments, if the join operation on two EHL representations produces a result that decrypts to 0, then the two objects encrypted by the EHL representations are equal, with high probability.

In some embodiments, other types of data structures may be used as alternatives or in addition to the EHL data structure. In some embodiments, another data structure EHL+ may be used. In the EHL+ data structure, the input object is hashed to a list structure, and only the hash values of these hash functions are encrypted using a partially homomorphic encryption scheme. The end result is another data structure EHL+ that has similar homomorphic properties with respect to Paillier encryption but exhibits a lower false positive rate and is smaller in size.

Figure 4:
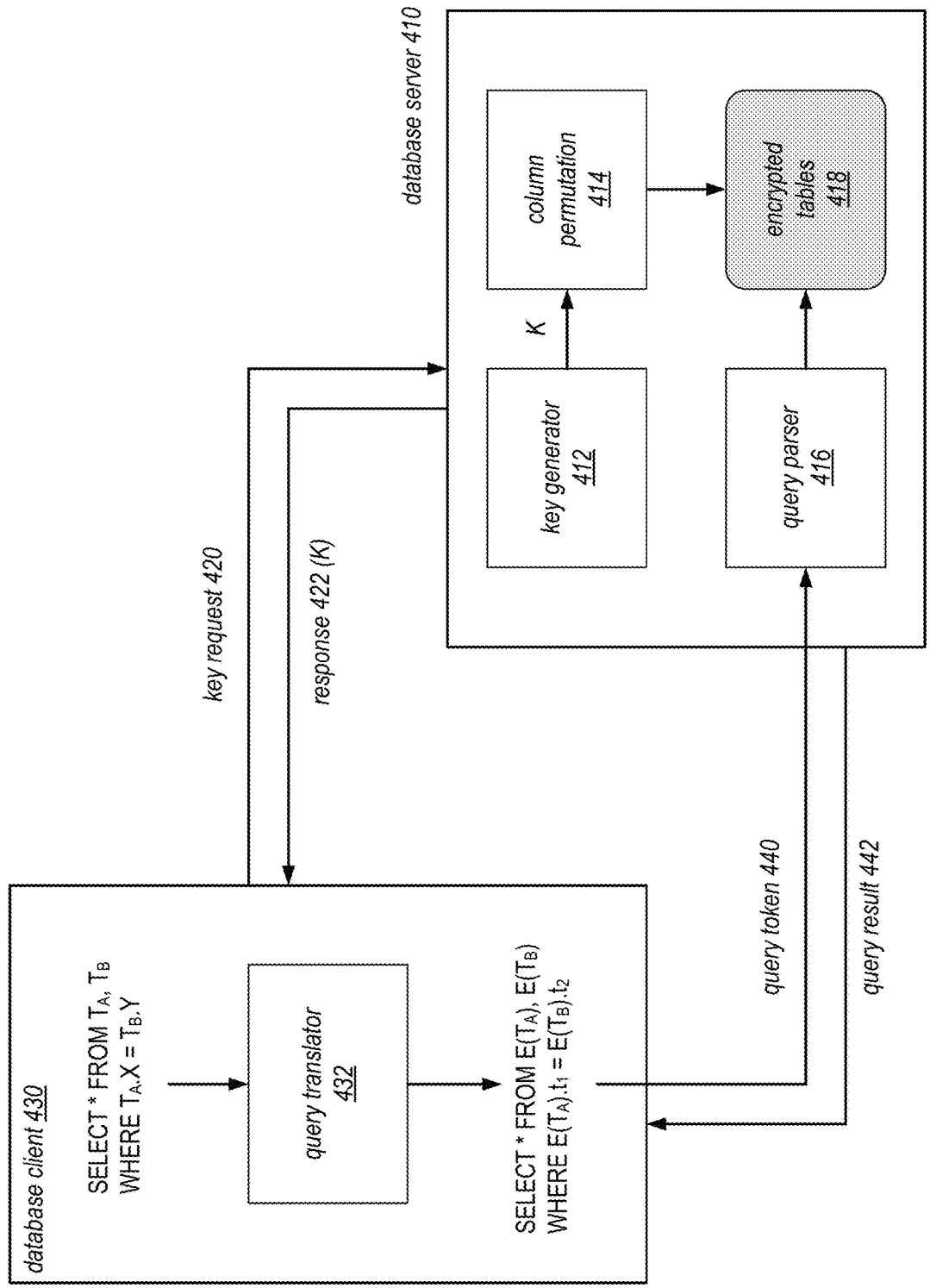
FIG. 4 illustrates example interactions between a database client and a database server to encrypt and query a table using a column permutation key, according to some embodiments.

FIG. 4 illustrates example interactions between a database client and a database server to encrypt and query a table using a column permutation key, according to some embodiments. As shown, the figure depicts an interaction between a database server 410 and a database 430. In some embodiments, the database server 410 may operate as database server 140 of FIG. 1, and the database client 430 may operate as client 110 of FIG. 1.

As shown, the database server 410 may distribute a column permutation key K to the database client 430 to allow the client to query the encrypted tables 418, whose columns have been permuted. The process begins when the tables are first encrypted. At that time, a key generator 412 may generate a random key K, which is to be used as a column permutation key. As discussed in connection with FIG. 2, as part of the encryption of the table 418, a column permutation module 414 may apply a randomization function, using the permutation key K, to the columns of the table 418. As a result, queries against the encrypted table 418 must specify column identifiers of the permutated columns in the table.

At operation 420, the database client 430 sends a key request 420 to the database server 410. In some embodiments, the request 420 may be sent just before a query is issued by the client. In some embodiments, the client may perform a one-time authentication or registration with the database server, and the key K may be obtained as a result of the registration. As shown, the key K may be distributed to the client in a response 422. In some embodiments, the request 420 and response 422 may be encrypted to protect the data from being seen over the network.

In some embodiments, the client 430 may retain the key K, which may be used to translate columns identifiers in the plaintext table to permuted column identifiers in the encrypted tables 418. As shown, in some embodiments, the client 430 may implement a query translator 432. The query translator 432 may be employed to translate a query against tables with unpermuted columns, such as the first query in the figure, to a query with permuted column identifiers, such as the second query in the figure. In some embodiments, the translation may be performed using the permutation function that was used by the database server to originally permutate the columns.

In some embodiments, the client 430 may convert the translated query into a query token 440, and submit the query token to the database server 410 as the query. In some embodiments, the query token 440 may be in a specialized format, which may be encrypted and/or compressed. In some embodiments, the query token may be parsed by a query parser 416. In some embodiments, the query parser 416 may extract the permuted column identifiers from the query token 440, and process the query using the permuted column identifiers. After the query is processed by the database server, the query results 442 are returned to the client 430.

In some embodiments, the server 410 and the client 430 may exchange messages in a multiparty communication protocol (MPC) in order to submit information in the query (e.g., the join columns). In some embodiments, the MPC protocol may be used in addition to the query token 440 to further secure the query communication. For example, in some embodiments, the column identifiers may be determined via a deciphering function that requires the input of both the client and the server (e.g., two separate column mappings). The client may specify the column identifiers as results of one intermediate mapping and provide the results to the server. The server in turn may remap the intermediate mapping results to obliviously obtain the desired column identifiers of the client. Under an MPC communication protocol, the server may never learn the mapping used by the client, and the client may never learn the mapping used by the server during the MPC protocol communications. However, both parties are able to collaborate to securely communicate the query columns over the communication network.

Figure 5:
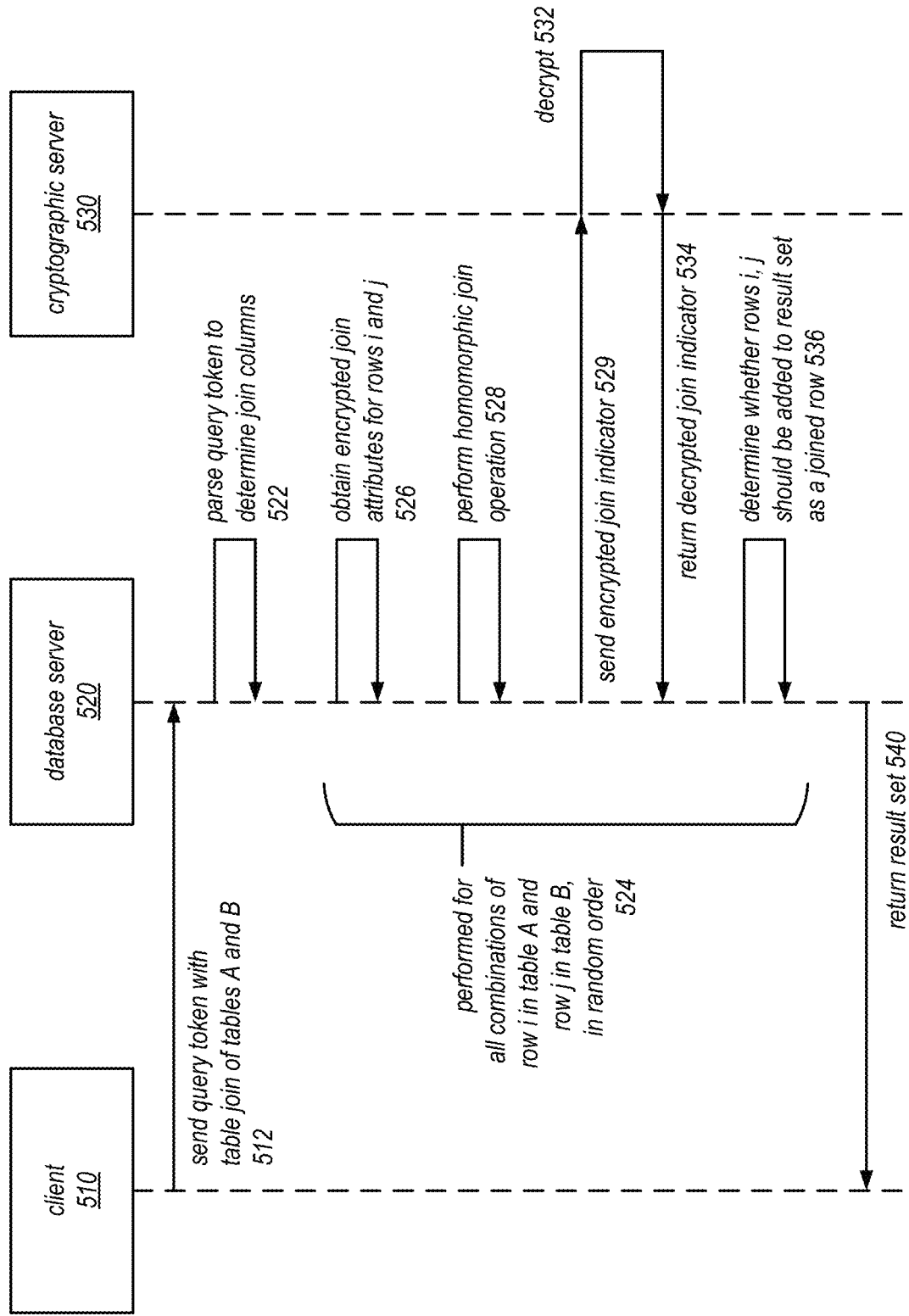
FIG. 5 is a system sequence diagram illustrating example interactions among a database client and two servers to perform a table join in a two-server table join protocol for encrypted tables, according to some embodiments.

FIG. 5 is a system sequence diagram illustrating example interactions among a database client and two servers to perform a table join in a two-server table join protocol for encrypted tables, according to some embodiments. In some embodiments, the client 510 may be the client 110 of FIG. 1, the database server 520 may be the database server 140 of FIG. 1, and the cryptographic server 530 may be the cryptographic server 170 of FIG. 1.

As shown, at operation 512, the client 510 sends a query token with a table join of tables A and B. The query token may be similar to query token 440, as discussed in connection with FIG. 4. In some embodiments, the query token may specify the join columns of the two tables using permuted column identifiers. The identifiers may refer to permuted columns in the encrypted database that have been permuted during database encryption. The client 510 may possess a query translator that translates queries with desired column names into queries specifying the permuted column identifiers, using a permutation key that was obtained from the database server 520.

At operation 522, the query token is received by the database server 520 and parsed, to determine the join columns of the query. In some embodiments, the query token may be encrypted and/or compressed, and the database server 520 may decrypted and decompress the token. In some embodiments, the database server may parse the query token to extract information from the query such as select columns, various filter conditions, the join columns, among other parameters of the query. In some embodiment, operation 522 may be performed by a component such as the query parse 150 of FIG. 1.

A sequence of next operations by the database server 520 is performed for all combination of rows i in table A and rows j in table B, in a random order. That is to join the two tables, the join attribute of each pair of rows in the two tables must be compared. The two rows are joined and included in the result set if their join attributes are equal. In some embodiments, the sequence of operations is performed in a pseudorandom order for the row pairs of the two tables, so that the cryptographic server 530 do not receive decryption requests in any particular order. This measure prevents the cryptographic server 530 from easily inferring information from the ordering or pattern of the decryption requests.

At operation 526, the encrypted join attributes for a particular pair of rows i and j are obtained. The join attributes are determined based on the column identifiers extracted from the query token. The rows of the two tables may be fetched into memory and then combined into row pairs a pseudorandom order. The row pairs are evaluated to determine whether they should be joined by comparing their join attributes. In some embodiments, operation 526 may be performed by a component such as the row pair randomizer 154 of FIG. 1.

At operation 528, a homomorphic join operation is performed on the join attributes of rows i and j. As discussed, in some embodiment, the join attributes may be encrypted in an encrypted representation, such as the EHL data structure. In some embodiments, the encryption scheme used for the encrypted representation may be homomorphic with respect to the join operation. Thus, the homomorphic join operation may be performed on these encrypted values to replicate a corresponding operation that can be performed on the unencrypted values. In some embodiments, the output of the join operation is an encrypted join indicator that is encrypted under the same encryption scheme as the encrypted representations of the input values. In some embodiments, the join operation may comprise an operation that determines whether the two join attribute values are equal. In some embodiments, the join operation may be a probabilistic operation that can occasionally return false positive results. In some embodiments, operation 528 may performed by a component such as the join attribute comparator 156 of FIG. 1. In some embodiments, the join operation may be the e operator, as specified in Equation (1) above.

At operation 529, the encrypted result of the join operation, which may be an encrypted join indicator, is sent to the cryptographic server 530. In some embodiments, the row pair randomization may be performed at this stage. In some embodiments, the join indicators may be sent to the cryptographic server in randomized batches. In some embodiments, the communications between the server 520 and server 530 may be further encrypted using another encryption protocol implemented for the communication channel.

At operation 532, the cryptographic server 530 receives the encrypted join indicator, decrypts it, and returns it 534 back to the database server 520. In some embodiments, the cryptographic server 530 may possess the decryption key or keys needed to decrypt the join indicator. In some embodiments, the decryption key or keys may not be accessible by the database server 520. As may be understood, the cryptographic server 530 never obtains the encrypted data values in the encrypted database; it only receives randomized join indicators of two unknown values. In some embodiments, the decryption keys may include the various Paillier decryption keys that were used to generate EHL data structures (i.e., the decryption keys for each bit in the EHL list structures). In some embodiments, the operation 532 may be performed by a component such as the join indicator decryption unit 174, as discussed in connection with FIG. 1.

At operation 534, the database server 520 receives the decrypted join indicator and uses it to determine whether rows i and j should be added to the result set as a joined row. In some embodiments, this determination is made based on whether the join indicator has a value of zero. In some embodiments, where the join condition involves multiple join columns, the process may determine whether the difference indicator for all join attributes are zero. If the join condition is met, the row pair in question is joined and added to the result set. In some embodiments, the result set is an intermediate result set, which is passed on to downstream components in the query engine for further processing.

At operation 540, the database server 520 constructs the results set for the client's query and returns the result set back to the client. In some embodiments, operation 540 may be performed by a component such as the result assembler 158 of FIG. 1.

An example algorithm for performing the secure join protocol for two tables is provided below:

---

Algorithm 2:

State:
    Server $S_1$ holds encrypted relations $E(R_1)$ and $E(R_2)$
    Server $S_2$ holds decryption key sk
Input:
    Query Token $t_Q$ = SELECT * FROM $E(R_1)$, $E(R_2)$ WHERE
        $E(R_1) \cdot t_1 = E(R_2) \cdot t_2$
Steps:
    Server $S_1$:
        1. Parse the token and let $i_1 = t_1$ and $j_2 = t_2$
        2. For each $E(o_i) \in E(R_1)$ and $E(o_j) \in E(R_2)$ in random order, do:
            a. For the $i_1$th attribute in $E(R_1)$ and $j_2$th attribute in $E(R_2)$, compute encrypted join indicator
                $b_{ij} \leftarrow EHL(o_i) \ominus EHL(o_j)$
            b. Send $b_{ij}$ to $S_2$ and receive back decrypted join indicator $b'_{ij}$
            c. If $b'_{ij} = 0$, then merge the encrypted attributes to one row as $E(o_{ij})$;
                otherwise do not merge the attributes
            end
        3. Combine the merged rows and set them as $E(R_1 \bowtie_{sec} R_2)$
    Server $S_2$:
        Upon receiving the join indicator $b_{ij}$, decrypt it using the private key sk and send the decrypted indicator back to $S_1$
Output:
    The joined encrypted table $E(R_1 \bowtie_{sec} R_2)$

---

In the above algorithm, $E(R_1)$ and $E(R_2)$ are the two encrypted relations or tables to be joined. $E(R_1) \cdot t_1$ and $E(R_2) \cdot t_2$ are the permuted column identifiers for the join columns, as determined by the querying client.

Figure 6:
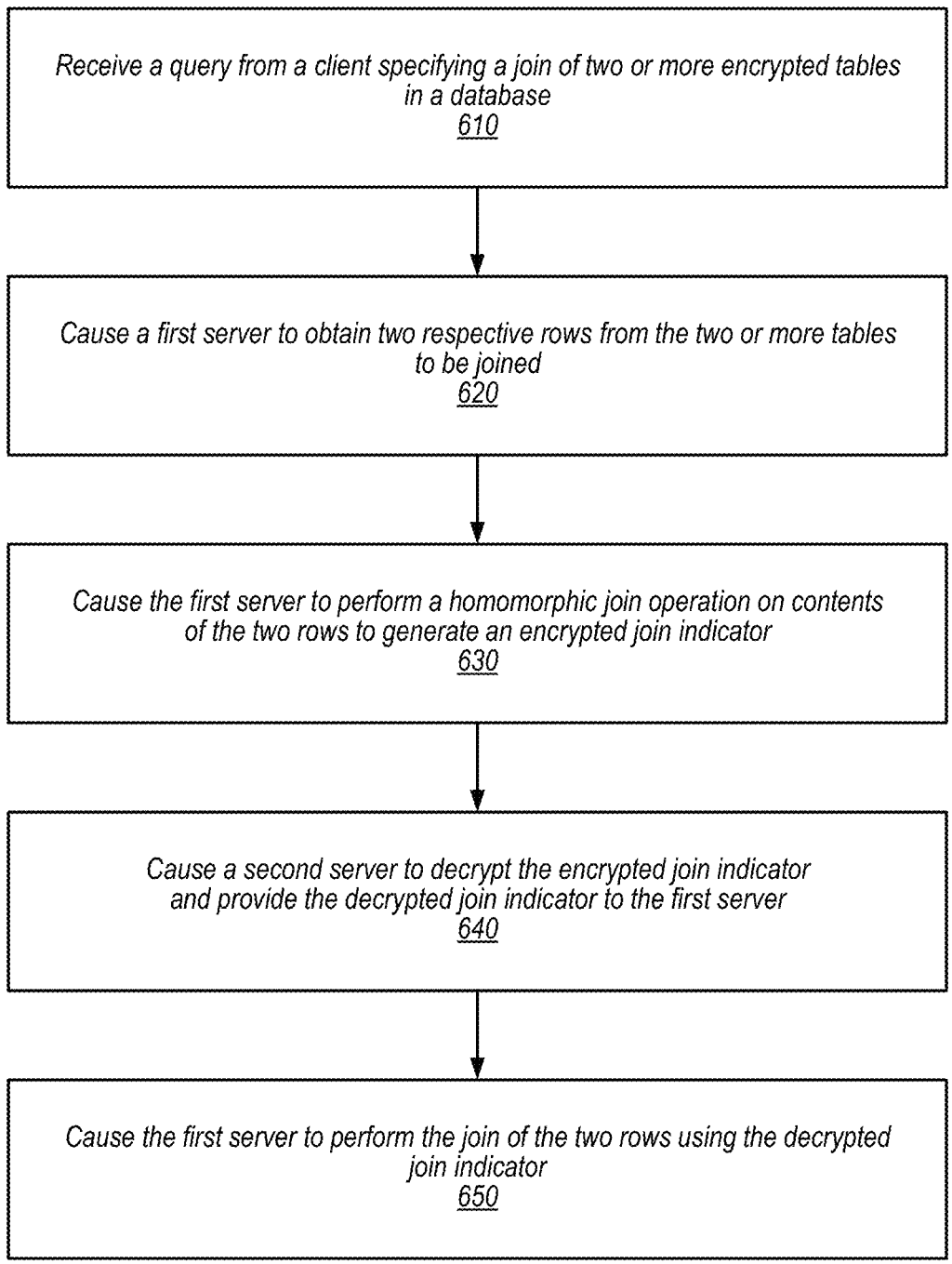
FIG. 6 is a flowchart illustrating a process of performing a query with a table join using a two-server table join protocol for encrypted tables, according to some embodiments.

FIG. 6 is a flowchart illustrating a process of performing a query with a table join using a two-server table join protocol for encrypted tables, according to some embodiments. The operation of FIG. 6 may be performed using, for example, the database server 140 and the cryptographic server 170, as discussed in connection with FIG. 1.

The process begins at operation 610, where a query is received from a client specifying a join of two encrypted tables in a database. In some embodiments, the query may be presented as a query token that indicates the join columns of the two encrypted tables.

At operation 620, a first server is caused to obtain two respective rows from the two tables, in order to evaluate the two rows for the join. In some embodiments, the first server is a database server that has access to the encrypted data of the database but does not have the decryption key(s) for encrypted join attributes in the tables. In some embodiments, the operation may be repeated for all combination of respective rows in the two tables. In some embodiments, the pairs of row pairs may be evaluated in a pseudorandom order.

At operation 630, the first server is caused to perform a homomorphic join operation on contents of the two rows to generate an encrypted join indicator. In some embodiments, the rows may contain, for its respective join attributes, an encrypted representation of those join attributes. In some embodiments, the first server may compare the two join attributes in encrypted form, using the homomorphic join operation, without decrypting the contents of the rows. In some embodiments, the encrypted representation of the join attributes may be an EHL data structure, as discussed in connection with FIG. 3. In some embodiments, the join operation may be implemented as Equation (1), as discussed above. In some embodiments, the resulting join indicator may be an encrypted value encrypted under a Paillier encryption scheme.

At operation 640, a second server is caused to decrypt the encrypted join indicator and provide the decrypted join indicator to the first server. In some embodiments, the second server is a cryptographic server that has possession or access of the decryption key(s) associated with the encrypted representations but not the underlying encrypted data of the database. In some embodiments, the second server may be implemented in a separate provide network or separate cloud-based service as the database server. In some embodiments, the second server may be independently operated by another operator. In some embodiments, this operation is triggered by the first server sending the encrypted join indicator to the second server.

At operation 650, the first server is caused to perform the join of the two rows using the decrypted join indicator, which was decrypted by the second server. In some embodiments, the decrypted join indicator may indicate whether the join attributes of the two rows are equal. In some embodiments, if the join attributes of the two rows are indicated to be equal (e.g., if the indicator has a value of zero), the two rows are joined. If not, the two rows are excluded from the result set of joined rows. In some embodiments, the comparison may be performed for multiple columns, where multiple columns are used as join columns for the query.

As may be understood, during this protocol, neither the first server or the second server has all the information to fully decrypt the encrypted representations for the join attributes. In some embodiments, the first server has access to encrypted versions of the contents of the two rows and the second server does not. In some embodiments, the second server has access to a decryption key to decrypt the encrypted join indicator and the first server does not. Thus, both servers are operating obliviously with respect to any given row pair without comparing the join attributes in plaintext. Moreover, because neither server has both the encrypted content and the decryption key, a compromise of one individual server does not compromise the entire encrypted database, and each server is less likely to be targeted for attacks.

Figure 7:
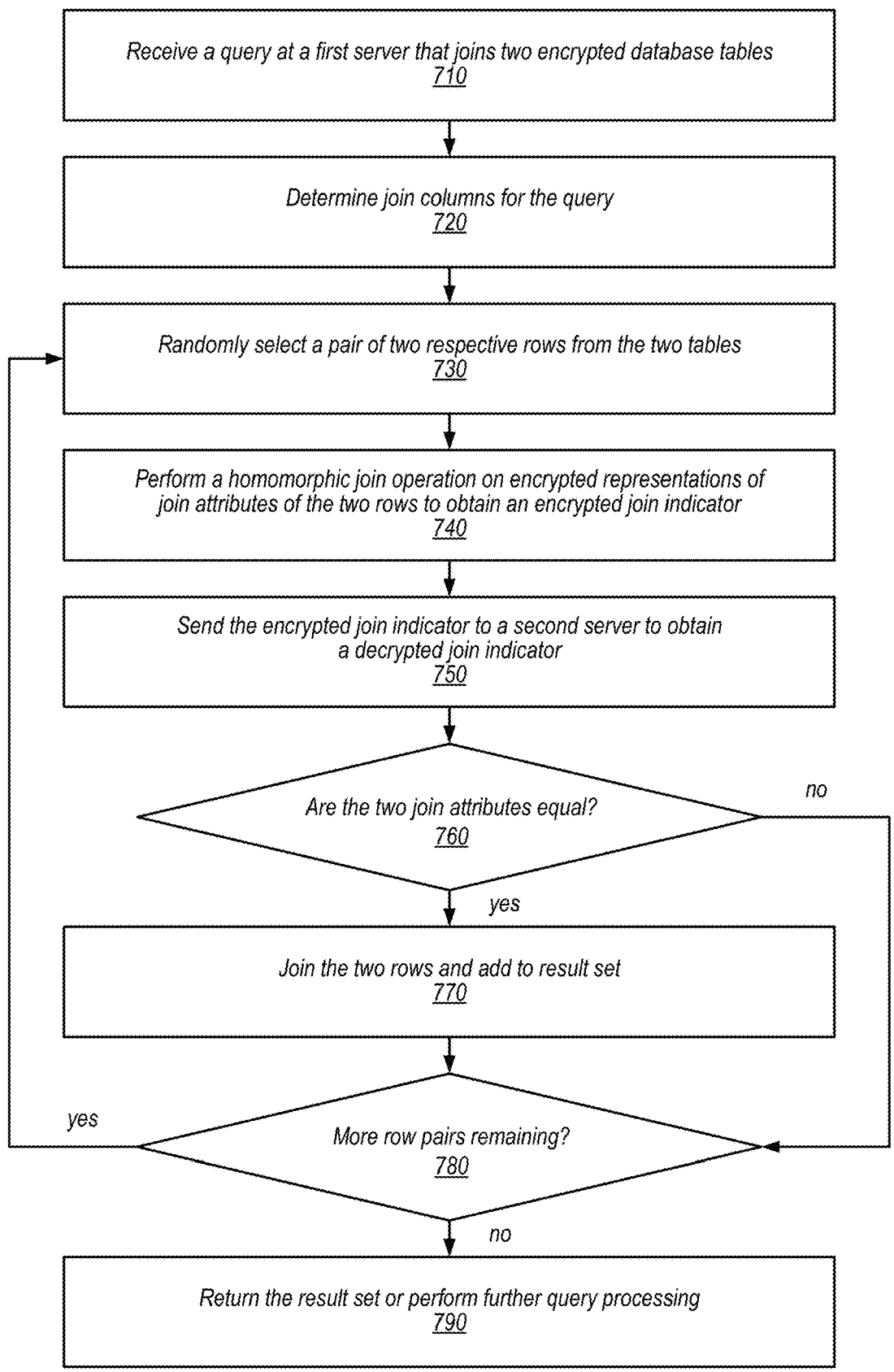
FIG. 7 is a flowchart illustrating a process of performing a query with a table join using a two-server table join protocol for encrypted tables, according to some embodiments.

FIG. 7 is a flowchart illustrating a process of performing a query with a table join using a two-server table join protocol for encrypted tables, according to some embodiments. The operation of FIG. 7 may be performed by, for example, the database server 140, as discussed in connection with FIG. 1.

At operation 710, a query is received at a first server, where the query specifies a join of two encrypted database tables. The first server of this operation may be the database server 140 of FIG. 1, for example. Operation 710 may be performed in similar fashion as operation 610 of FIG. 6.

At operation 720, the join columns for the query are determined. Operation 720 may be performed by for example the query parser 150 of FIG. 1. In some embodiments, the query parser may parse a query token, which specifies column identifiers for the join column. In some embodiments, the column identifiers may refer to permuted columns, which were permuted during an encryption of the tables. In some embodiments, the join columns may be determined via messages exchanges between the client and the server in accordance with a secure multiparty communication (MPC) protocol. For example, in some embodiments, the client and the server may collaborate to cipher and decipher the join columns of the query using two respective functions, and without revealing each's respective function to the other party.

At operation 730, a pair of respective rows from the two tables to be joined are randomly selected. The two rows are to be evaluated to determine whether they should be joined. The selection here may be performed in a pseudorandom manner, for example, based on a randomization value generated for the query. In some embodiments, the randomization may be performed when the rows are fetched from storage. In some embodiments, the randomization may be performed when row pairs are selected in memory. In some embodiments, the randomization may be performed by the row pairs are sent to downstream components (e.g., the cryptographic server). This randomization hides the actual order of the rows in the two tables from the cryptographic server, making it more difficult for the cryptographic server to extract any information from the pattern of decryption requests.

At operation 740, a homomorphic join operation is performed on the encrypted representations of the join attributes of the two rows to obtain an encrypted join indicator. This operation is performed in similar fashion as operation 630, as discussed in connection with FIG. 6.

At operation 750, the encrypted join indicator is sent to a second server to obtain a decrypted join indicator. The second server may be a cryptographic server, for example server 170 of FIG. 1. The sending of the join indicator may comprise sending a message via a secure messaging protocol, or calling a service API exposed by the second server, among other communication protocols. In some embodiments, operation 750 may be performed in similar fashion as described for operation 640 of FIG. 6.

At operation 760, a determination is made whether the two join attributes are equal. In some embodiments, this determination is made using the decrypted join indicator received from the second server. In some embodiments, if the decrypted join indicator indicates a value of zero, the two join attributes deemed to be equal. If the two join attributes are equal, the process proceeds to operation 770, where the two rows are joined and added to a result set. If not, the process does not add the two rows to the result set as a joined row, and proceeds to operation 780.

At operation 780, a determination is made whether there are more row pairs remaining for the two tables to be evaluated. If so, the process loops back to operation 730, where another pair of rows of the two tables are randomly selected for evaluation. If not, the process proceeds to operation 790. Accordingly, the process implements a loop that iterates to evaluate all row pair combinations in the two tables. In some embodiments, the processing of these row pairs may be divided among a number of processing nodes, which may operate in parallel to evaluate the row pairs for the join.

At operation 790, the result set is returned to the querying client, or the result set is passed to downstream components for further query processing. In some embodiments, this operation may be performed by for example the result assembler 158 of FIG. 1. In some embodiments, result set may be further processed to performed additional processing, such as for example applying additional filters, sorts, or row aggregations, etc. In some embodiments, the results set may comprise a response to the query, and the returning of the response may include encrypted row data, which may be further encrypted according to a secure communication protocol when it is transmitted to the client.

Figure 8:
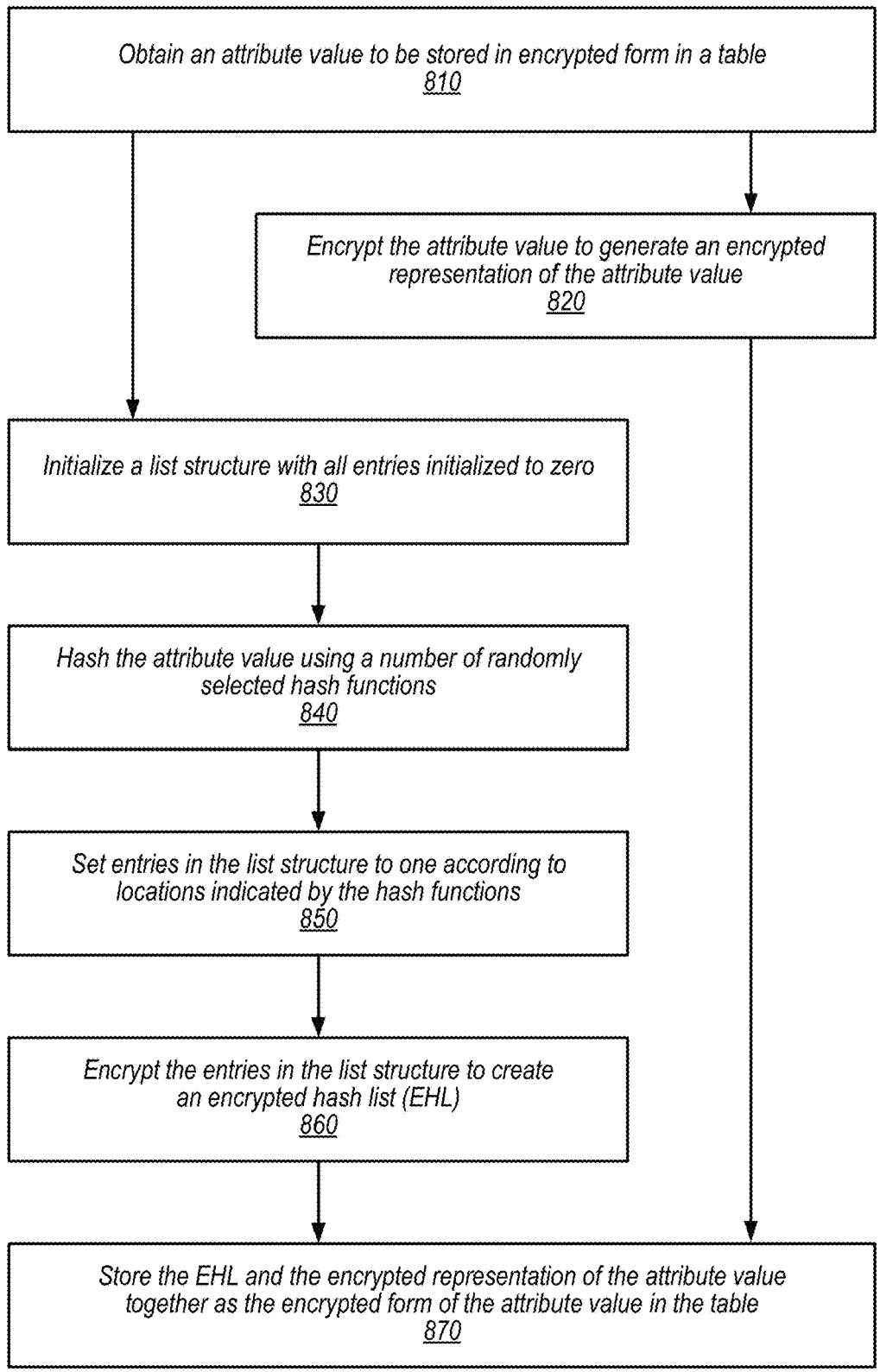
FIG. 8 is a flowchart illustrating a process of encrypting a table to support a two-server table join protocol for encrypted tables, according to some embodiments.

FIG. 8 is a flowchart illustrating a process of encrypting a table to support a two-server table join protocol for encrypted tables, according to some embodiments. In some embodiments, the depicted process may be performed by a database server, such as database server 140 of FIG. 1. In some embodiments, the encryption process may be performed by a join server in the database, which may be an internal server that does not handle client requests for the database.

At operation 810, an attribute value to be stored in encrypted form in a table is obtained. In some embodiments, this operation may be performed when the attribute value is inserted or updated. In some embodiments, the operation may be performed when the data is loaded to the encrypted database. Depending on the embodiment, all attribute values or only certainly attribute values in the table may be encrypted. For example, in some embodiments, certain attributes that will not be used for join attributes or filter conditions may not be encrypted in this manner. In some embodiments, the encryption may be performed using one or more public keys that are counterpart to private key(s) kept by the cryptographic server. Thus, encrypted join indicators computed from these encrypted attribute representations can be decrypted by the cryptographic server.

As shown, the encryption process goes through two paths. Under the first (left hand) path, a space-efficient probabilistic data structure is created. This probabilistic data structure may be the encrypted join structure 222 of FIG. 2, or the EHL data structure of FIG. 3. Under the second (right hand) path, another encrypted data structure is created. This other data structure may be for example the encrypted attribute value 224 of FIG. 2. As discussed, in some embodiments, these two structures are stored together as the encrypted representation of the attribute value.

At operation 820, the attribute value is encrypted to generate an encrypted representation of the attribute value. In some embodiments, the underlying attribute value may be fully obtained from a decryption of the representation created in this operation, without any loss of information. In some embodiments, this representation is returned as a part of query results.

As shown, operations 830, 840, 850, and 860 describe the generation of the probabilistic data structure for the attribute value. In some embodiments, the probabilistic data structure is used to evaluate table joins. In some embodiments, as shown, the probabilistic data structure may comprise an EHL data structure, as discussed in connection with FIG. 3.

At operation 830, a list structure is initialized with all entries set to zero. This list structure will be the same size for all attribute values. Thus, all attribute values are normalized so they can be used as input parameters to the join operator.

At operation 840, the attributes value is hashed using a number of randomly selected hash functions. In some embodiments, the hash functions may be generated using a single general hash function and a set of randomly generated hash function keys. In some embodiments, these hash function keys are generated secretly by the cryptographic server and maintained by the cryptographic server. Thus, in some embodiments, the generation of the EHL data structure may require some involvement from the cryptographic server. In other embodiments, the hash function keys may be shared by the database server and the cryptographic server under certain circumstances.

At operation 850, entries in the list structure are set according to locations indicated by the hash functions. In some embodiments, a modulo function is applied to the results of the hash functions, using the size of the list structure, which reduces the hash values to a location value in the list structure. In some embodiments, every location in the list structure that are indicated by resulting hash function are set to one. As may be understood, given a sufficiently large number of hash functions and a sufficiently large list structure, any attribute value may be mapped in this fashion to a bit string that is unique, with high probability.

At operation 860, the entries in the list structure are encrypted using an encryption scheme to create the EHL structure. In some embodiments, the encryption scheme may be homomorphic with respect to the join operation. For example, in some embodiments, the encryption scheme may be a Paillier encryption scheme, which may use a different encryption key parameter for each entry location. By using the Paillier encryption scheme, additions or subtractions of two unencrypted values may be replicated on their encrypted versions using a multiplication.

As may be understood, the EHL data structure is only one example data structure that may be used for the encrypted representation of join attributes. In some embodiments, another data structure (for example the EHL+ structure described above) may also be used. Those of ordinary skill in the art may appreciate that other types of encryptions structures with homomorphic properties may also be used, depending on the embodiment.

At operation 870, the EHL data structure and the other encrypted representation are stored together as the encrypted form of the attribute value in the table. Thus, the encrypted attribute values in the table has at least two components, as shown in FIG. 2. In some embodiments, the EHL structure may represent a compact representation of the attribute value that are used for different querying purposes, such as table joins. In some embodiments, the other representation of the attribute value is kept as a lossless representation of the attribute value, which is to be returned in query responses.

Figure 9:
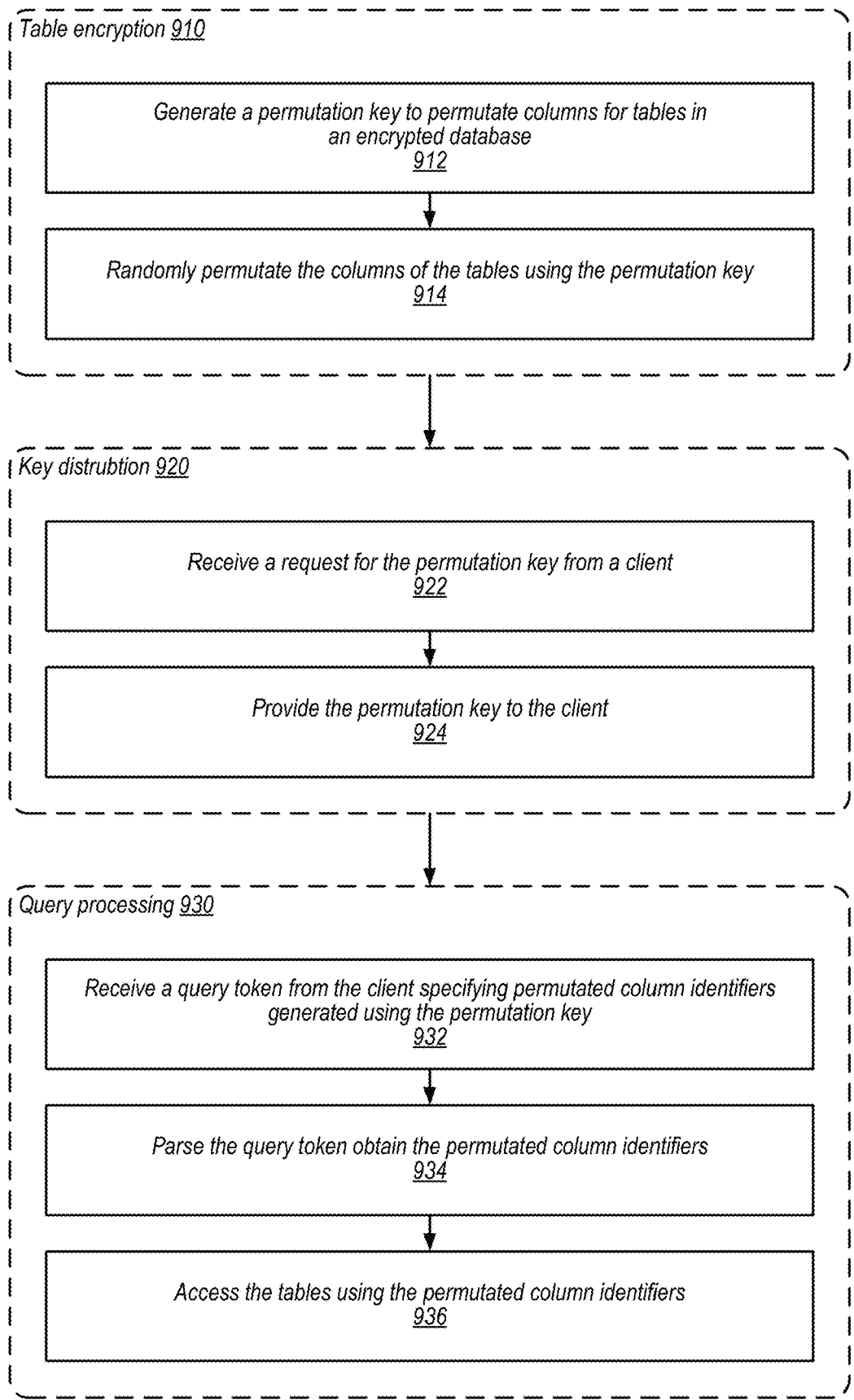
FIG. 9 is a flowchart illustrating a process of encrypting a table to encrypt and query a table using a column permutation key, according to some embodiments.

FIG. 9 is a flowchart illustrating a process of encrypting a table to encrypt and query a table using a column permutation key, according to some embodiments. As shown, the process in the figure is divided into three stages, table encryption stage 910, key distribution stage 920, and query processing stage 930.

In the table encryption stage 910, the tables in the encrypted database are encrypted. At operation 912, a permutation key is generated to permutate the columns for the tables in an encrypted database. In some embodiments, the permutation key may be generated by a component such as key generator 412 of FIG. 4. In some embodiments, the permutation key may be used to determine the permuted column identifiers for the columns of the encrypted table.

At operation 914, the columns of the tables are randomly permutated using the permutation key. In some embodiments, the permutation may be performed by the column permutation component 414 of FIG. 4. In some embodiments, the column permutation may be performed according to a permutation function, which takes the permutation key as a parameter, and randomly assigns permuted column identifiers to the columns of the table. After the columns are permutated, the tables may be published as encrypted tables in the encrypted database.

In the key distribution stage 920, the permutation key is provided to a client, which allows the client to query the encrypted tables using the permutated column identifiers. At operation 922, the database receives a request from the client for the permutation key. In some embodiments, this request may be received at the time of the query. In some embodiments, the request may be received as part of an authentication request to authenticate the client. In some embodiments, the permutation key is only provided to only certain clients that are authorized to read particular tables.

At operation 924, the permutation key is provided to the client. In some embodiments, the permutation key may be provided in a response message, which may be encrypted to be transmitted over a untrusted network. In some embodiments, the permutation key may be made available to the client, for example, at a secure location that is accessible via another key or access credential. The client may be instructed to retrieve the permutation key from that secure location.

In the query processing stage 930, a query is received that contains one or more permuted column identifiers. At operation 932, a query token is received at the database from a client specifying permuted column identifiers generated using the permutation key. The query token may be, for example, the query token 440, as discussed in connection with FIG. 4. In some embodiments, the client may employ a query translator that uses the permutation key to translate a query with the plaintext names of the columns to a query with the permuted column identifiers. In some embodiments, the query token may be encrypted and compressed, according to a communication protocol between the database client and the database server.

At operation 934, the query token is parsed by the database to obtained the permutated column identifiers. In some embodiments, the parsing may be performed by for example the query parser 416 of FIG. 4. In some embodiments, the column identifiers may be remapped to an internal identifier for the columns, which may refer to storage locations or addresses for the columns within each row. In some embodiments, the query parser may determine that the permuted column identifiers correspond to an unrecognized or out-of-date permutation key, for example, via a version number included in the query token. In that event the parse may return an error back to the query client, indicating the error and instructing the client to refresh its copy of the permutation key.

At operation 936, the encrypted tables are accessed using the permutated column identifiers. In some embodiments, as discussed, these permuted column identifiers may be remapped to internal identifiers or may refer to storage locations or addresses for the permuted columns. Attribute values are thus specified by the query token can then be fetched from database storage according to the permuted column identifiers.

Figure 10:
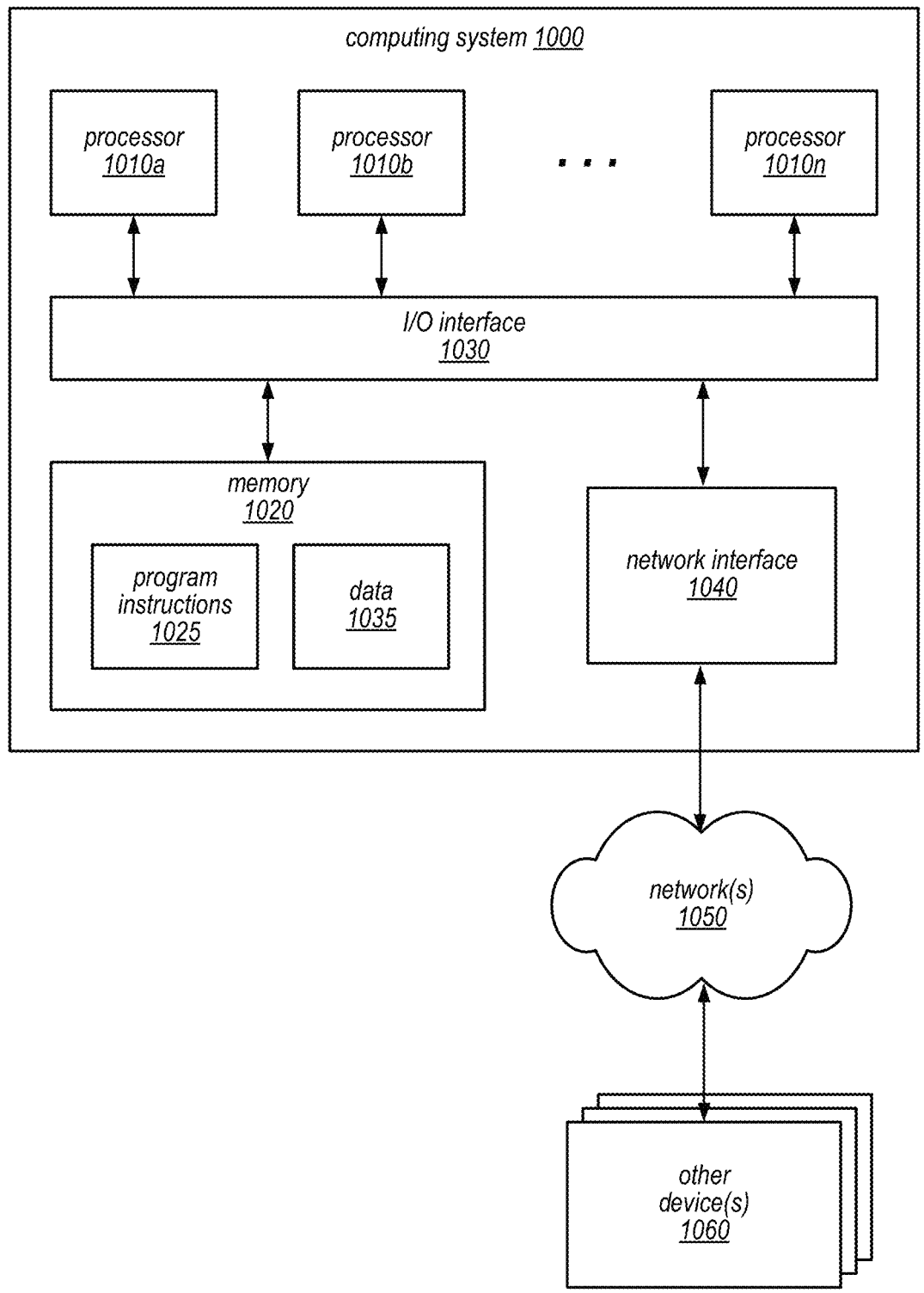
FIG. 10 is a block diagram illustrating an example computer system that can be used to implement one or more components of a database system that performs table joins using a two-server join protocol to encrypted tables, according to some embodiments.

FIG. 10 is a block diagram illustrating an example computer system that can be used to implement one or more components of a database system that performs table joins using a two-server join protocol to encrypted tables, according to some embodiments.

Computer system 1000 may include or be configured to access one or more nonvolatile computer-accessible media. In the illustrated embodiment, computer system 1000 includes one or more processors 1010 coupled to a system memory 1020 via an input/output (I/O) interface 1030. Computer system 1000 further includes a network interface 1040 coupled to I/O interface 1030.

In various embodiments, computer system 1000 may be a uniprocessor system including one processor 1010, or a multiprocessor system including several processors 1010 (e.g., two, four, eight, or another suitable number). Processors 1010 may be any suitable processors capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

System memory 1020 may be configured to store instructions and data accessible by processor(s) 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 1020 as code 1025 and data 1026. The system memory 1020 may include different levels of cache, some of which may be located on the CPU and some away from the CPU. One level of the cache hierarchy may be a last level cache that is shared by all of the processors 1010a to 1010n. The last level cache may be an inclusive cache of the low levels of cache in the cache hierarchy.

In one embodiment, I/O interface 1030 may be configured to coordinate I/O traffic between processor 1010, system memory 1020, and any peripheral devices in the device, including network interface 1040 or other peripheral interfaces. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments some or all of the functionality of I/O interface 1030, such as an interface to system memory 1020, may be incorporated directly into processor 1010.

Network interface 1040 may be configured to allow data to be exchanged between computer system 1000 and other devices 1060 attached to a network or networks 1050, such as other computer systems or devices, such as routers and other computing devices, as illustrated in FIGS. 1 through 9, for example. In various embodiments, network interface 1040 may support communication via any suitable wired or wireless general data networks, such as types of Ethernet network, for example. Additionally, network interface 1040 may support communication via telecommunications/telephony networks such as analog voice networks or digital fiber communications networks, via storage area networks such as Fibre Channel SANs, or via any other suitable type of network and/or protocol.

In some embodiments, system memory 1020 may be one embodiment of a computer-accessible medium configured to store program instructions and data as described above for FIGS. 1 through 9 for implementing embodiments of methods and apparatus for traffic analysis. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 1000 via I/O interface 1030. A non-transitory computer-accessible storage medium may also include any volatile or non-volatile media such as RAM (e.g. SDRAM, DDR SDRAM, RDRAM, SRAM, etc.), ROM, etc, that may be included in some embodiments of computer system 1000 as system memory 1020 or another type of memory. Further, a computer-accessible medium may include transmission media or signals such as electrical, electromagnetic, or digital signals, conveyed via a communication medium such as a network and/or a wireless link, such as may be implemented via network interface 1040.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. A system comprising:
one or more computers configured to implement a database system to:
receive a database query that specifies a join operation to be performed on contents of two or more rows of two or more encrypted database tables;
in response to receiving the database query:
cause a first server to perform a homomorphic join operation on contents of the two or more rows of the two or more encrypted database tables to generate an encrypted join indicator from the contents of the two or more rows;
cause a second server to decrypt the encrypted join indicator and provide the decrypted join indicator to the first server; and cause the first server to perform the join operation;
wherein the first server has access to encrypted versions of the contents of the two or more rows of the two or more encrypted database tables and the second server does not, and the second server has access to a decryption key to decrypt the encrypted join indicator and the first server does not.

2. The system of claim 1, wherein:
to generate the encrypted join indicator, the first server is to perform the homomorphic join operation on two encrypted representations of join attributes of a pair of respective rows from two of the encrypted database tables;
to cause the second server to decrypt the encrypted join indicator, the first server is to send the encrypted join indicator to the second server; and
to perform the join operation, the first server is to determine, according to the decrypted join indicator decrypted by the second server, whether the join attributes of the pair are equal;
wherein the determination of whether the join attributes are equal is performed for all pairs of respective rows of the two encrypted database tables.

3. The system of claim 2, wherein the first server is to send encrypted join indicators for all pairs of respective rows of the two encrypted database tables to the second server in a pseudo-random order.

4. The system of claim 2, wherein the database system is to:
prior to receiving the query, generate the encrypted representations of individual join attributes in the two encrypted database tables, to:
initialize a list structure for the join attribute with all entries initialized to zero;
set selected ones of the entries to one, wherein the selected entries are determined based at least in part on a plurality of hash functions applied to the join attribute; and
encrypt the entries in the list structure using an encryption scheme that is homomorphic with respect to the homomorphic join operation.

5. The system of claim 4, wherein to encrypt the entries in the list structure, the database system is to perform the encryption using a Paillier encryption scheme.

6. A method comprising:
receiving a database query to cause a join operation to be performed on contents of two or more rows of two or more encrypted database tables;
in response to receiving the database query:
causing a first server to generate an encrypted join indicator from the contents of the two or more rows;
causing a second server to decrypt the encrypted join indicator and provide the decrypted join indicator to the first server; and
causing the first server to perform the join operation.

7. The method of claim 6, wherein generating the encrypted join indicator includes causing the first server to perform a homomorphic join operation on the contents of the two or more rows of the two or more encrypted database tables.

8. The method of claim 6, wherein the second server has access to a decryption key to decrypt the encrypted join indicator and the first server does not.

9. The method of claim 6, wherein the first server has access to encrypted versions of the contents of the two or more rows of the two or more encrypted database tables and the second server does not.

10. The method of claim 6, wherein:
the first server is part of a database management service provided by one service provider; and
the second server is part of a cryptographic service provided by another service provider.

11. The method of claim 6, wherein:
generating the encrypted join indicator comprises performing a homomorphic join operation on two encrypted representations of join attributes of a pair of respective rows from two of the encrypted database tables;
causing the second server to decrypt the encrypted join indicator comprises sending, by the first server, the encrypted join indicator to the second server; and
performing the join operation comprises determining, according to the decrypted join indicator decrypted by the second server, whether the join attributes of the pair are equal;
wherein the determination of whether the join attributes are equal is performed for all pairs of respective rows of the two encrypted database tables.

12. The method of claim 11, wherein:
the sending of encrypted join indicators to the second server is performed for all pairs of respective rows of the two encrypted database tables in a pseudo-random order.

13. The method of claim 11, further comprising:
prior to receiving the query, generating the encrypted representations of individual join attributes in the two encrypted database tables, the generation including:
initializing a list structure for the join attribute with all entries initialized to zero;
setting selected ones of the entries to one, wherein the selected entries are determined based at least in part on a plurality of hash functions applied to the join attribute; and
encrypting the entries in the list structure using an encryption scheme that is homomorphic with respect to the homomorphic join operation.

14. The method of claim 13, wherein the encryption of the entries is performed using a Paillier encryption scheme.

15. The method of claim 6, further comprising:
prior to receiving the query, permutating columns of the two encrypted database tables according to a pseudo-random permutation function and a permutation key to assign the columns to permutated column identifiers; and
providing the permutation key to a client, wherein the permutation key enables the client to generate the permutated column identifiers;
wherein the query specifies two or more permutated column identifiers for columns to be used as join columns for the query.

16. A non-transitory computer-accessible storage medium storing program instructions that when executed on one or more processors of a first server cause the first server to:
in response to receiving a database query that specifies a join operation to be performed on contents of two or more rows of two or more encrypted database tables:
perform a homomorphic join operation on contents of the two or more rows of the two or more encrypted database tables to generate an encrypted join indicator from the contents of the two or more rows;

cause a second server to decrypt the encrypted join indicator and provide the decrypted join indicator to the first server; and perform the join operation;

wherein the first server has access to encrypted versions of the contents of the two or more rows of the two or more encrypted database tables and the second server does not, and the second server has access to a decryption key to decrypt the encrypted join indicator and the first server does not.

17. The non-transitory computer-accessible storage medium of claim 16, wherein the program instructions when executed on the one or more processors cause the first server to:

generate the encrypted join indicator via the homomorphic join operation performed on two encrypted representations of join attributes of a pair of respective rows from two of the encrypted database tables;

send the encrypted join indicator to the second server; and perform the join operation based at least in part on a determination, according to the decrypted join indicator decrypted by the second server, whether the join attributes of the pair are equal;

wherein the determination of whether the join attributes are equal is performed for all pairs of respective rows of the two encrypted database tables.

18. The non-transitory computer-accessible storage medium of claim 17, wherein the program instructions when executed on the one or more processors cause the first server to send encrypted join indicators for all pairs of respective rows of the two encrypted database tables to the second server in a pseudo-random order.

19. The non-transitory computer-accessible storage medium of claim 17, wherein the program instructions when executed on the one or more processors cause the first server to:

prior to receiving the query, generate the encrypted representations of individual join attributes in the two encrypted database tables, to:

initialize a list structure for the join attribute with all entries initialized to zero;

set selected ones of the entries to one, wherein the selected entries are determined based at least in part on a plurality of hash functions applied to the join attribute; and encrypt the entries in the list structure using an encryption scheme that is homomorphic with respect to the homomorphic join operation.

20. The non-transitory computer-accessible storage medium of claim 19, wherein to encrypt the entries in the list structure, the program instructions when executed on the one or more processors cause the first server to perform the encryption using a Paillier encryption scheme.

* * * * *